May 31, 1927.
R. W. SEYMOUR
GARAGE
Filed June 5, 1926
1,631,068
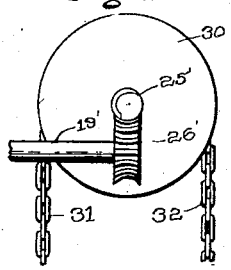
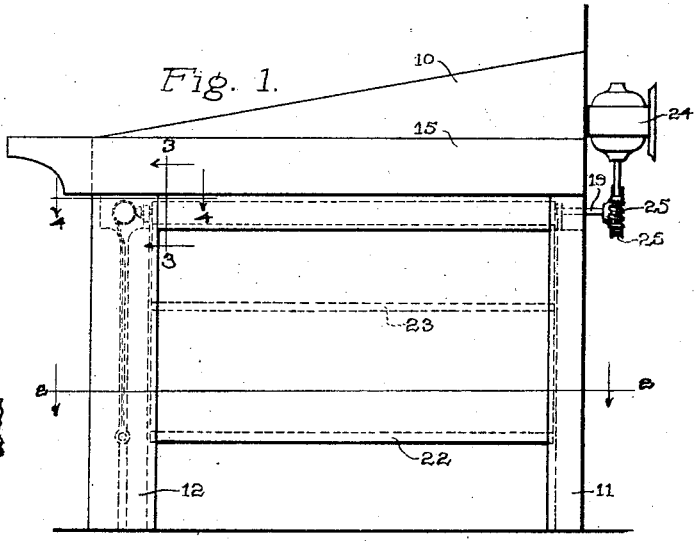
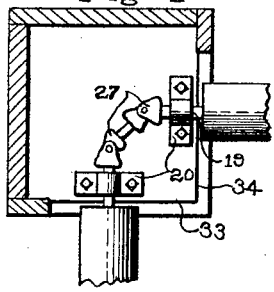
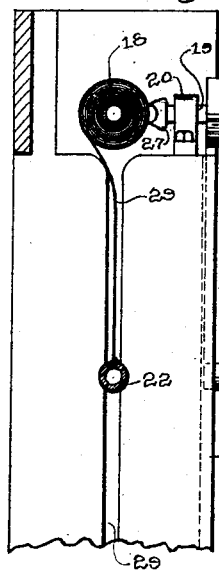
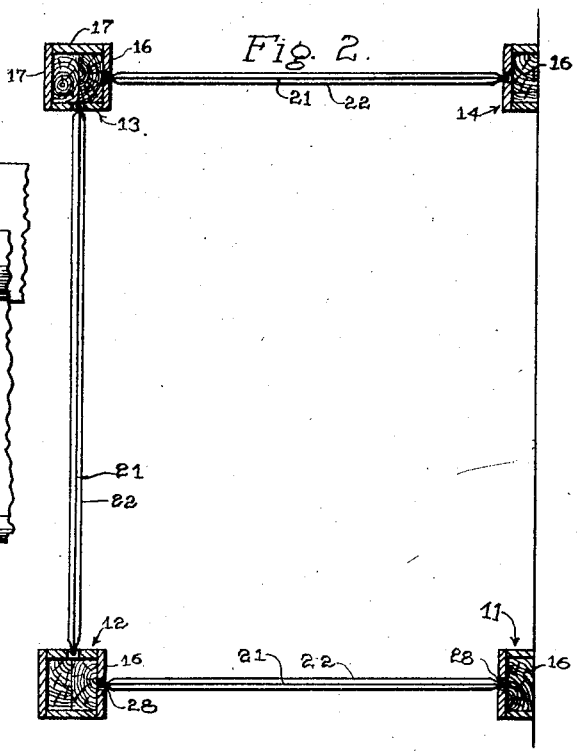
Inventor:—
Robert Walter Seymour
By *Attorneys*

Patented May 31, 1927.

1,631,068

UNITED STATES PATENT OFFICE.

ROBERT WALTER SEYMOUR, OF CHICAGO, ILLINOIS.

GARAGE.

Application filed June 5, 1926. Serial No. 113,888.

This invention relates to building construction, more particularly to a building which has open sides adapted to be closed for the purpose of housing an automobile or the like. While the specific construction which I shall hereafter describe is adapted to be employed to house an automobile I do not intend to limit the invention to this purpose.

In certain climates it is the practice to provide a porte cochère on the side of a dwelling or the like for shading and covering a vehicle employed by occupants of the building.

This makes a suitable place to set an automobile while not in use as it covers it from the weather.

During pleasant weather or slight precipitation the automobile may be left there even over night but if the weather grows severe or the car is to be left there regularly it is desirable to close off the sides of the porte cochère thereby to protect the automobile from rain or snow or dust and to close it from view. It will also serve to keep off dew or frost.

Now in order to enable those skilled in the pertinent art to construct and use my invention, I shall describe in connection with the accompanying drawings a specific embodiment of the same.

In the drawings:—

Fig. 1 is a side elevation of a building embodying my invention;

Fig. 2 is a horizontal section of the same as seen on the line 2—2 of Fig. 1;

Fig. 3 is an enlarged fragmentary section as seen on the line 3—3 of Fig. 1;

Fig. 4 is an enlarged fragmentary section taken on the line 4—4 of Fig. 1; and

Fig. 5 is a fragmentary view of a modification of the operating means.

Like reference numerals indicate identical parts throughout the several views.

The particular structure shown in the drawings comprises a roof 10 and corner posts 11, 12, 13 and 14. Obviously the two posts 11 and 14 may be omitted and the guides mentioned later, formed directly on or in the side of the house. Joists 15 support the roof between the corner posts. The corner posts comprise studs 16 with suitable sheathing 17 nailed thereto. The inner studs are cut off somewhat short of the roof to provide a pocket or recess at the top of the post to house the bearings and connections for the roller mechanism, upon which curtains are supported.

The roller mechanism comprises a plurality of rollers 18 of any desirable material. I have employed cast iron pipe because of its rigidity. Axles 19 are fixed to the ends thereof and these axles are journalled in bearings 20. The bearings 20 are mounted in the recesses at the top of the posts. A suitable curtain 21 of canvas or any other material is rolled on each roller. The ends of these curtains are weighted by a suitable rigid bar or pipe 22. In order to keep the curtain from being blown or bellied inward, rigid bars or slats may be fastened to the curtains as shown at 23.

The rollers are as shown in Fig. 1 operated in unison by an electric motor 24 driving through a worm gear train 25—26. The power is transmitted from one curtain to another by means of double universal joints 27, although bevel gears or any other suitable connecting means may be used.

The edges of the curtains are guided in grooves or ways in or on the corner posts. These are of a size suitable to receive the ends of the pipe or bar 22, and hold the same against lateral or endwise motion. This pipe may be pinched at the ends to permit the groves 28 to be made narrower in order that the structure may be more nearly windproof.

Fig. 5 shows a means for operating the curtains by hand and comprises a continuous chain and a sprocket wheel 30 for the chain. The sprocket wheel is of a known type used in portable hoists. The portion 31 of the chain may be led to the outside of the structure and the portion 32 led to the inside, or vice versa. Other suitable means may be provided, such as a roller chain and sprocket to be operated by a crank or a hand wheel from either side of the structure. Or if desired a shaft may be led up to drive the rollers.

From the foregoing it will be seen that I have provided disappearing sides for a porte cochère which may be quickly raised or lowered by a self-locking operating mechanism. Due to the fact that a worm drive is employed, the curtains cannot drop of their own weight and no extra means for keeping them from unrolling is required. Obviously instead of a worm and wormwheel other operating means may be employed particularly if the curtain rollers are provided with balancing springs as is well known in the art. I prefer the structure shown because of its simplicity. In this structure the self locking characteristic of the worm device is valuable. While I have shown the building embodying my invention as a porte cochère i. e. a roofed structure open on three sides and having the other side closed by the main building of which it is a part, it is to be understood that the building may be entirely independent of other buildings and be open on all four sides or it may be open on only one or two sides.

The bearings 20 and the couplings 23 may be enclosed completely as by means of plates 33, 34 thru which the spindles or axles 19 project.

The bearings 20 may be mounted on a common face plate to maintain them in permanent alinement.

It is obvious that other types of curtains, and of other materials such as articulated steel slats and the like may be used without departing from the scope of my invention. The dimensions and construction of the corner posts may be varied to suit different conditions and climates, as well as different power supplies and different means for driving one curtain from the other. I therefore do not intend that the scope of my invention be limited to the above detailed description, except in so far as defined by the scope and spirit of the appended claim.

I claim:—

In a building structure, such as a porte-cochère adapted to be used in conjunction with a principal structure such as a building, a roof disposed abutting the side of said adjoining building, a plurality of corner posts for supporting the said roof, a plurality of sides comprising flexible curtains connected to said posts for cooperating with the adjoining building to enclose the space under said roof, means associated with the curtains and the said posts for enabling the curtains to be rolled up and down, and means for guiding the curtains in their up and down movement, said curtains being adapted when rolled down to provide a weather tight enclosure and when rolled up to clear the top of an automobile or the like.

In witness whereof, I hereunto subscribe my name this 3rd day of June, 1926.

ROBERT WALTER SEYMOUR.